Dec. 18, 1923.
J. G. STOKES
TRACTION DEVICE
Filed Nov. 8, 1922
1,477,983
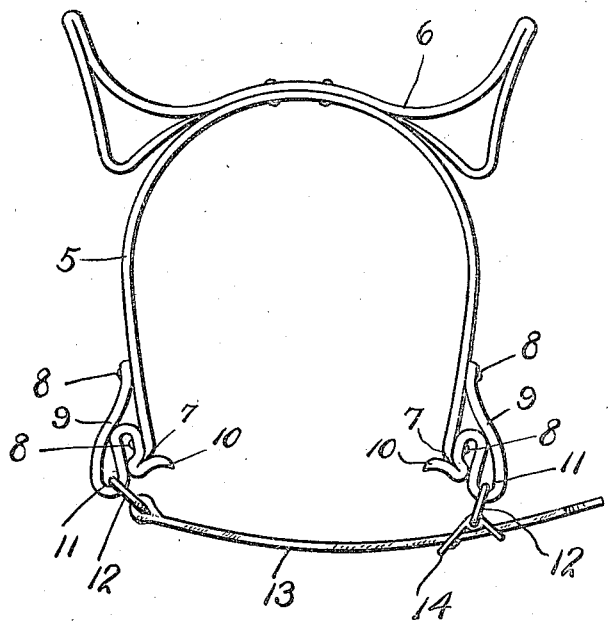
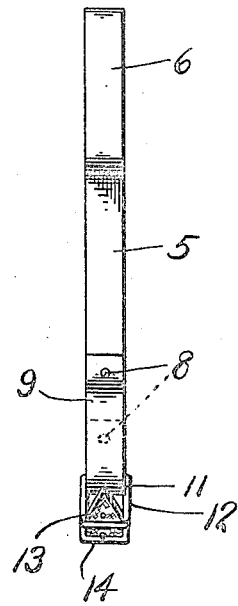
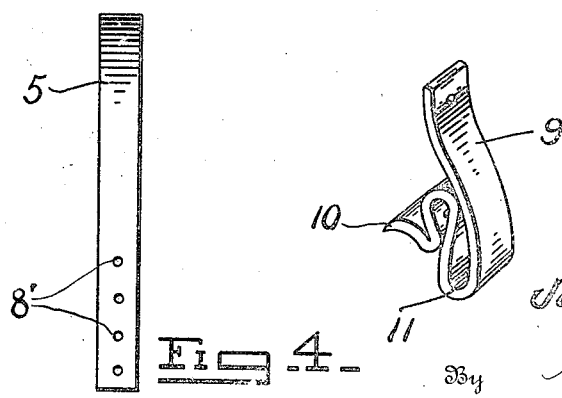
Inventor
James G. Stokes
By W. H. Wills
Attorney Patented Dec. 18, 1923.

1,477,983

UNITED STATES PATENT OFFICE.

JAMES G. STOKES, OF BURGAW, NORTH CAROLINA.

TRACTION DEVICE.

Application filed November 8, 1922. Serial No. 599,660.

*To all whom it may concern:*

Be it known that I, JAMES G. STOKES, a citizen of the United States, residing at Burgaw, in the county of Pender and State of North Carolina, have invented certain new and useful Improvements in Traction Devices, of which the following is a specification.

This invention relates to automobile wheel attachments, and more particularly to improvements on the traction devices shown in my Patent No. 1,431,338, Oct. 10, 1922.

The primary object of this invention resides in the provision of a traction device, for automobile wheels, having rim engaging means adapted to fit varying types of rims.

Another object of this invention resides in the provision of a traction device, for automobile wheels, having rim engaging clips formed to properly fit varying types of rims and provide means for fastening securing straps thereto so the device can be secured on the automobile wheel.

A still further object of this invention resides in the provision of a traction device consisting of a tire band having rim engaging clips which can be disposed on the band for readily fitting tires which vary in size and also those having worn treads.

With these and other objects in view, this invention resides in certain novel features of construction, arrangement and combination of elements illustrated in the accompanying drawing and hereinafter set forth in the specification and more particularly pointed out in the appending claims.

In the accompanying drawing:—

Fig. 1 is an end view of a traction device as constructed in accordance with this invention.

Fig. 2 is a side view thereof.

Fig. 3 is a detail perspective view of one of the rim engaging clips.

Fig. 4 is a side view of the tire engaging band.

In the present embodiment of this invention the numeral 5 designates a substantially semi-circular band perferably formed of metal sufficiently resilient that the same can be readily sprung over an automobile tire.

Suitably secured at the medial portion of the band 5 is a tread member 6 similar to that shown in my former patent.

Secured to the free ends 7 of the band 5, as at 8, are clips 9. Each clip is formed from a single piece of metal and is bent to provide a rim engaging bill 10 and ring loop 11, the rim engaging bill being bent so as to readily accommodate itself to rims of varying types and is adapted to be strengthened by being riveted tightly against the free ends of the bands.

In order that the band 5 may be successfully used for either new or worn tires, that is tires having treads of various thicknesses, the ends of the band are provided with a series of apertures 8' to permit the attachment of the clips 9 at various points on the bands after the desired portions of the ends have been cut off. With the aforesaid structure, it will be noted that the clips, when raised, will cause the band to rest against the tread of the tire as the bills 10 engage the rim, thus preventing rocking motion of the band against the tread of the tire.

In each of the ring loops 11 is supported a ring 12, one of which affords means for fastening a leather strap 13 to one side of the band, while the other affords means for supporting a buckle 14 to receive the free end of the strap when fastening the band on an automobile wheel.

With this invention fully set forth, it is manifest that a meritorious device of this character has been produced, and, through the simplicity of construction thereof, the cost of manufacture is reduced to the minimum.

Having thus described this invention what I claim and desire to protect by Letters Patents is:

1. In a traction device of the character set forth, comprising an open band, a tread member on the band, clips on the ends of the band, rim engaging bills on the clips, and band fastening means carried by the clips.

2. In a traction device of the character set forth, comprising a substantially semi-circular band, traction means on the band, clips on the free ends of the band, rim engaging bills on the clips, a ring carried by each clip, a leather strap secured to one of the rings and a buckle secured to the other ring.

3. In a traction device of the character set forth, comprising an open band, traction means secured to the band, clips having ring loops therein secured to the free ends of the band, rim engaging bills at the free ends of the clips, rings carried in the loops of the clips, a leather strap secured to one of the rings, and a fastening element carried by the other ring.

In testimony whereof I affix my signature.

JAMES G. STOKES.